US012744163B2

(12) United States Patent
Nobumori et al.

(10) Patent No.: US 12,744,163 B2
(45) Date of Patent: Sep. 22, 2026

(54) CAPACITOR AND METHOD FOR MANUFACTURING SAME

(71) Applicant: Panasonic Intellectual Property Management Co., Ltd., Osaka (JP)

(72) Inventors: Chiho Nobumori, Hyogo Ken (JP); Kenichi Ezaki, Osaka Fu (JP); Yoshiaki Obana, Osaka Fu (JP); Hitoshi Ishimoto, Hyogo Ken (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 203 days.

(21) Appl. No.: 18/851,209

(22) PCT Filed: Mar. 28, 2023

(86) PCT No.: PCT/JP2023/012480
§ 371 (c)(1),
(2) Date: Sep. 26, 2024

(87) PCT Pub. No.: WO2023/190499
PCT Pub. Date: Oct. 5, 2023

(65) Prior Publication Data

US 2025/0226159 A1 Jul. 10, 2025

(30) Foreign Application Priority Data

Mar. 29, 2022 (JP) ................................ 2022-054259
Mar. 29, 2022 (JP) ................................ 2022-054293

(51) Int. Cl.
*H01G 9/02* (2006.01)
*H01G 9/00* (2006.01)
*H01G 9/035* (2006.01)

(52) U.S. Cl.
CPC ............ *H01G 9/02* (2013.01); *H01G 9/0029* (2013.01); *H01G 9/035* (2013.01)

(58) Field of Classification Search
CPC ......... H01G 9/035; H01G 9/0029; H01G 9/02
(Continued)

(56) References Cited

U.S. PATENT DOCUMENTS

2007/0002522 A1 1/2007 Takeda et al.
2013/0295374 A1 11/2013 Tang et al.
(Continued)

FOREIGN PATENT DOCUMENTS

JP 2007-043105 A 2/2007
JP WO2012/073998 A1 5/2014
(Continued)

OTHER PUBLICATIONS

International Search Report dated Jun. 6, 2023 issued in International Patent Application No. PCT/JP2023/012480, with English translation.

*Primary Examiner* — Arun Ramaswamy
(74) *Attorney, Agent, or Firm* — Rimon P.C.

(57) ABSTRACT

A capacitor including a first electrode including a first active material, a second electrode including a second active material, a separator interposed between the first electrode and the second electrode, and an electrolyte solution. The electrolyte solution contains an ionic liquid. In a pore diameter distribution of the separator, a total volume Va in a pore diameter range of 0.1 μm to 2 μm is 0.4 $cm^3/g$ or more.

16 Claims, 2 Drawing Sheets

(58) Field of Classification Search
USPC ................................ 361/512, 502, 503, 504
See application file for complete search history.

(56) References Cited

U.S. PATENT DOCUMENTS

| | | | |
|---|---|---|---|
| 2015/0270522 | A1 | 9/2015 | Yamada et al. |
| 2017/0170522 | A1 | 6/2017 | Moganty et al. |

FOREIGN PATENT DOCUMENTS

| | | | | | |
|---|---|---|---|---|---|
| JP | 2019-505947 | A | | 2/2019 | |
| KR | 20130073926 | A | * | 7/2013 | ........ H01M 10/0567 |
| WO | 2014/046094 | A1 | | 3/2014 | |

* cited by examiner

CAPACITOR AND METHOD FOR MANUFACTURING SAME

CROSS-REFERENCE TO RELATED APPLICATIONS

This application is the U.S. National Phase under 35 U.S.C. § 371 of International Patent Application No. PCT/JP2023/012480, filed on Mar. 28, 2023, which in turn claims the benefit of Japanese Patent Application No. 2022-054259, filed on Mar. 29, 2022, and Japanese Patent Application No. 2022-054293, filed on Mar. 29, 2022 the entire disclosures of which Applications are incorporated by reference herein.

TECHNICAL FIELD

The present invention relates to a capacitor and a method for manufacturing the same.

BACKGROUND ART

In recent years, capacitors with high energy density have been desired. A higher operating voltage of a capacitor can provide a higher energy density, and in light of this, studies have been made to find a combination of an electrolyte solution and an electrode material that operates at high voltage.

Patent Literature 1 proposes a film of graphene sheets in which two or more graphene sheets are integrated in parallel via carbon nanotubes, and stacks of the integrated graphene sheets are electrically and mechanically connected to each other in a three-dimensional form via carbon nanotubes. A capacitance of 290.6 F/g has been reported using this film as electrodes.

CITATION LIST

Patent Literature

Patent Literature 1: Domestic re-publication of PCT international application No. 2012/073998

SUMMARY OF INVENTION

Technical Problem

The capacitor disclosed in Patent Literature 1 has a high output density as compared to lithium-ion batteries, but its energy density is still low and its application is limited. To expand the application of capacitors, it is desired to further increase the energy density of capacitors.

A higher operating voltage of a capacitor can provide a higher energy density. In light of this, studies have been made to find a combination of an electrolyte solution and an electrode material that operates at high voltage. However, in addition to an electrolyte solution and an electrode material, it is also important to find a separator that can realize a high energy density even under high voltage.

Solution to Problem

In view of the above, one aspect of the present invention relates to a capacitor, including: a first electrode including a first active material; a second electrode including a second active material; a separator interposed between the first electrode and the second electrode; and an electrolyte solution, wherein the electrolyte solution contains an ionic liquid, and in a pore diameter distribution of the separator, a total volume Va in a pore diameter range of 0.1 μm to 2 μm is 0.4 $cm^3/g$ or more.

In view of the above, another aspect of the present invention relates to a capacitor, including: a first electrode including a first active material; a second electrode including a second active material; a separator interposed between the first electrode and the second electrode; and an electrolyte solution, wherein the electrolyte solution contains an ionic liquid, and the separator includes a porous substrate, and a reduction reaction product of the ionic liquid fixed to the porous substrate.

In view of the above, still another aspect of the present invention relates to a method for manufacturing a capacitor including a first electrode including a first active material, a second electrode including a second active material, a separator interposed between the first electrode and the second electrode, and an electrolyte solution, the method comprising steps of: preparing a porous substrate, and an ionic liquid; and obtaining a separator by fixing a reduction reaction product of the ionic liquid to the porous substrate.

Advantageous Effects of Invention

According to the present invention, it is possible to realize a capacitor having a high energy density.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF EMBODIMENTS

Figure 1:
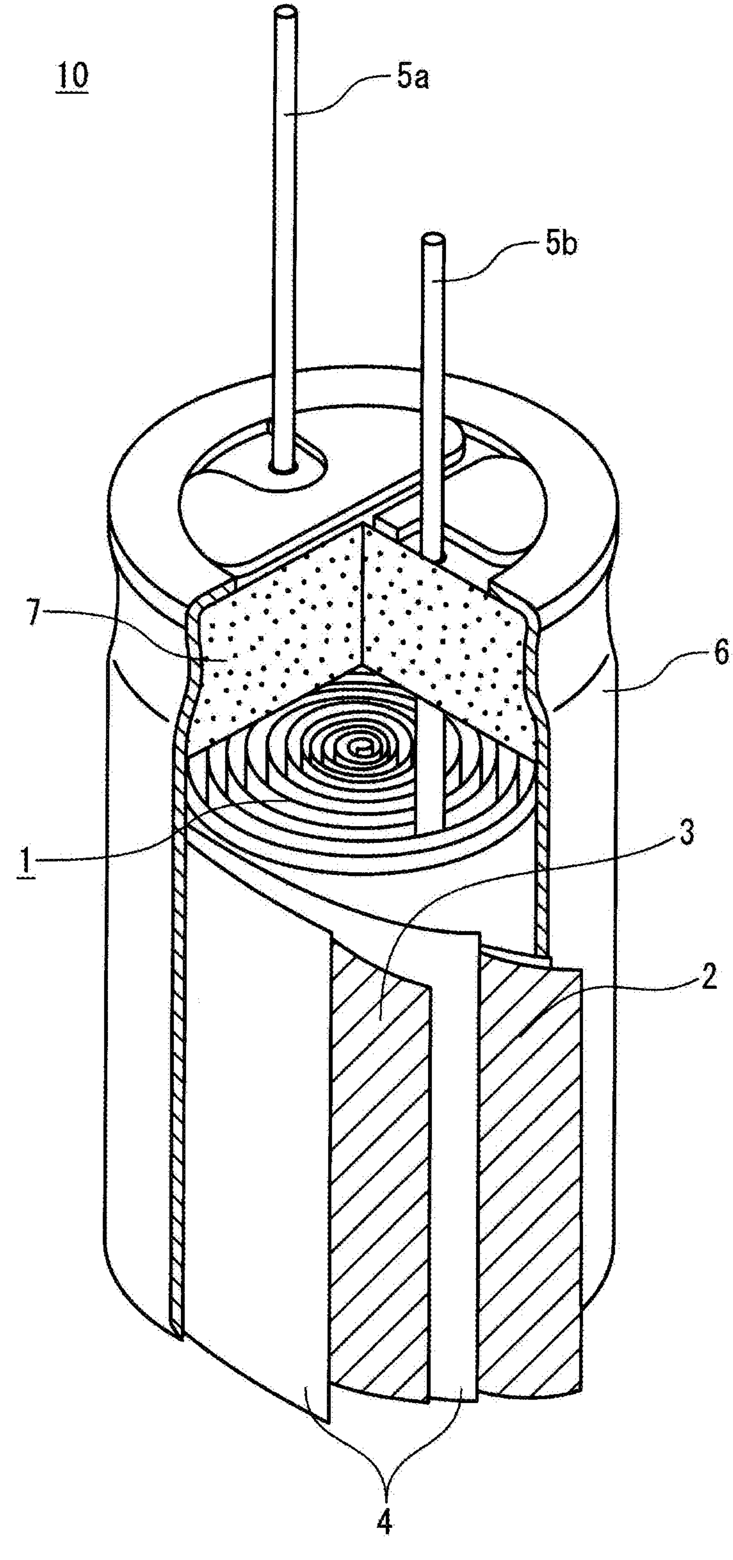
FIG. 1 A partially-cutaway oblique view of a capacitor according to the present invention.

Embodiments of the present disclosure will be described below by way of examples, but the present disclosure is not limited to the examples described below. In the following description, specific numerical values and materials are exemplified in some cases, but other numerical values and other materials may be adopted as long as the effects of the present disclosure can be obtained. In the present specification, the phase "a numerical value A to a numerical value B" includes the numerical value A and the numerical value B, and can be rephrased as "a numerical value A or more and a numerical value B or less." In the following description, when the lower and upper limits of numerical values related to specific physical properties, conditions, etc. are mentioned as examples, any one of the mentioned lower limits and any one of the mentioned upper limits can be combined in any combination as long as the lower limit is not equal to or more than the upper limit. When a plurality of materials are mentioned as examples, one kind of them may be selected and used singly, or two or more kinds of them may be used in combination.

The present disclosure encompasses a combination of matters recited in any two or more claims selected from plural claims in the appended claims. In other words, as long as no technical contradiction arises, matters recited in any two or more claims selected from plural claims in the appended claims can be combined.

In the following, the capacitor encompasses capacitors having various power storage mechanisms, and means a storage device having at least partially a power storage mechanism, such as an electric double layer capacitor and a lithium-ion capacitor. The power storage device or capacitor includes a pair of capacitor electrodes and an electrolyte solution. The electrodes include an active material.

The active material exhibits capacity, for example, through doping and dedoping ions thereto and therefrom. The doping of ions to the active material is a concept that includes adsorption of ions onto the active material, absorption of ions by the active material, and chemical interactions between the active material and ions. The dedoping of ions from the active material is a concept that includes desorption of ions from the active material, release of ions from the active material, and deactivation of chemical interactions between the active material and ions. However, in the present specification, the doping of ions to the active material mainly refers to adsorption of ions onto the active material, and the dedoping of ions from the active material mainly refers to desorption of ions from the active material. When ions are adsorbed onto the active material, an electric double layer is formed, to exhibit capacity. That is, the capacitor electrode mainly refers to a polarizable electrode, and may be an electrode which has the properties of a polarizable electrode and in which the Faraday reaction also contributes to the capacity.

A capacitor according to an embodiment of the present disclosure includes a first electrode including a first active material, a second electrode including a second active material, a separator interposed between the first electrode and the second electrode, and an electrolyte solution. One of the first electrode and the second electrode is a positive electrode of the capacitor, and the other is a negative electrode. The first electrode and the second electrode may be the same. The electrolyte solution contains an ionic liquid.

In a pore size distribution of the separator, a total volume Va in a pore diameter range of 0.1 μm to 2 μm is 0.4 $cm^3/g$ or more.

A high voltage of, for example, 4.0 V or more may be applied between the first electrode and the second electrode of the capacitor. In this case, by using a separator with the Va satisfying the above condition, a capacitor having high capacity and high energy density can be realized.

The reason why the capacity of the capacitor is significantly increased when the Va is 0.4 $cm^3/g$ or more is still under elucidation, but is presumably as follows. The present invention, however, is not limited thereto.

The cations or anions contained in the ionic liquid are reduced or oxidized by the application of a high voltage, and a reaction product resulting from the reduction reaction or oxidation reaction can be generated in the electrolyte solution. These reaction products, when present in the vicinity of the positive electrode or negative electrode, may interfere with the formation of an electric double layer, which is presumably one of the causes of a decrease in capacity.

For example, the reaction product may react with a member constituting the electrode layer (e.g., a functional group of the active material, a side chain of the binder, etc.), to generate a side reaction product. When these side reaction products accumulate in the vicinity of the positive electrode or negative electrode and in the voids of the electrode layer, this may decrease the active sites of the active material or hinder the movement (diffusion) of cations or anions, to interfere with the formation of an electric double layer, in some cases.

On the other hand, the separator can adsorb the reaction products. The reaction products adsorbed onto the separator will not interfere with the formation of the electric double layer at the positive and negative electrodes, and high capacity can be maintained. However, when the pore diameter of the separator is larger than 2 μm, the reaction products readily pass through the pores, and the effect of adsorbing the reaction products is small. In contrast, microfine pores with a pore diameter of 2 μm or less can easily trap the reaction products within the pores, and are highly effective in adsorbing and fixing the reaction products. When the Va is 0.4 $cm^3/g$ or more, the separator has a sufficient number of microfine pores with a pore diameter of 2 μm or less, and the reaction products are likely to be fixed therein. Presumably, as a result of this, a significantly high capacity can be maintained when the Va is 0.4 $cm^3/g$ or more.

In this case, it is more preferable that, in the pore diameter distribution of the separator, a total volume Vm in a pore diameter range of 0.01 μm to 6 μm is 0.7 $cm^3/g$ or more.

Specifically, for example, when 1-ethyl-3-methylimidazolium tetrafluoroborate ($EMIBF_4$) is used as the ionic liquid, during charging at a voltage of 4.0 V or higher, a 1-ethyl-3-methylimidazolium cation ($EMI^+$) is reduced at the negative electrode, and an EMI radical can be generated through a reaction shown in the following Reaction Formula 1.

Reaction Formula 1:

[Chem. 1]

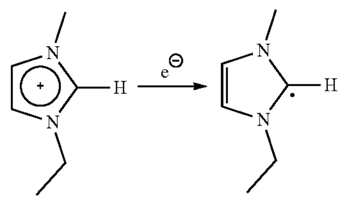

On the other hand, during discharging, the reverse reaction of the Chem. 1 may proceed, so that a reaction (oxidation reaction) in which the EMI radical releases one electron and returns to the $EMI^+$ cation may proceed. Therefore, the capacitor is considered to exhibit capacity though adsorption of cations or anions, and in addition, also exhibit additional capacity through redox reactions, which results in a significantly high capacity.

The EMI radical can turn into a carbene through a reaction shown in the following Reaction Formula 2. Also, a dimer can be generated through the reaction shown in the following Reaction Formula 3. The reactions shown in the Reaction Formulas 2 and 3 are equilibrium reactions. When the concentration of the ionic liquid ($EMIBF_4$) in the electrolyte solution is low, the reaction shown in the Reaction Formula 3 hardly proceeds, and the reaction shown in the Reaction Formula 2 mainly proceeds. On the other hand, when $EMIBF_4$ is present in the electrolyte solution at a high concentration, the reaction shown in the Reaction Formula 3 is likely to proceed. Regarding the EMI dimer, its presence can be confirmed by performing $^1$H-NMR analysis on the electrolyte solution. Regarding the EMI radical and the carbene, their presence cannot be identified by NMR, but ESR (electron spin resonance) can be used to confirm their presence.

Reaction Formula 2:

[Chem. 2]

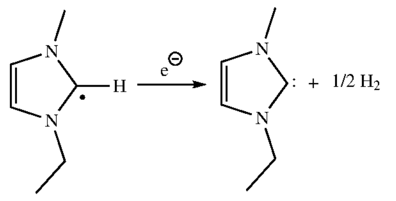

Reaction Formula 3:

[Chem. 3]

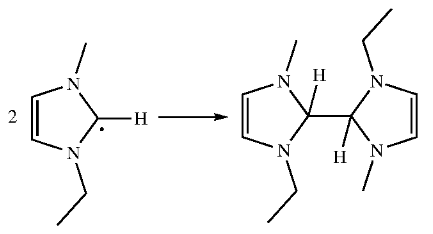

When the carbene and the dimer which are reaction products are present near the positive or negative electrode, as described above, the reaction products may interfere with the formation of an electric double layer, causing a decrease in capacity, in some cases. However, since the separator has the function of adsorbing and fixing the reaction products therein, the formation of an electric double layer is unlikely to be interfered by the reaction products, and the decrease in capacity is suppressed.

In addition, during discharging, the EMI radical is oxidized back into the EMI cation, thereby contributing to the capacity, whereas in the form of a carbene and a dimer, no direct contribution is made to the capacity. Therefore, the capacity of the capacitor is reduced by the amount of the carbene and dimer generated through the reaction of the EMI radical. However, in a capacitor according to an embodiment of the present disclosure, the carbene and the dimer are fixed in the separator, so that the concentration of the carbene and dimer in the vicinity of the negative electrode can be increased, and the equilibrium of each of the Reaction Formulas 2 and 3 can be shifted to the left. This suppresses the generation of carbene and dimer, so that, during discharging, a large number of the EMI radicals can be oxidized back to the EMI cations, and the capacity exhibited through redox reactions can be maintained high.

The pore volumes Va and Vm can be obtained by measuring the differential pore volume distribution or logarithmic differential pore volume distribution of the separator and integrating the pore diameters in the ranges of 0.1 μm to 2 μm and 0.01 μm to 6 μm, respectively. For measurement of the pore volume distribution, a mercury porosimeter based on mercury intrusion method, or a perm porometer based on bubble point method or gas permeation method can be used.

The volume Va in the pore diameter range of 0.1 μm to 2 μm of the separator may be 0.6 $cm^3/g$ or more. The volume Va may be 1.0 $cm^3/g$ or less, 0.8 $cm^3/g$ or less, or 0.7 $cm^3/g$ or less.

The porosity of the separator is preferably 60% or more, more preferably 65% or more, and even more preferably 70% or more.

The porosity of the separator is calculated from the following equation, where W ($g/cm^2$) is the mass per unit area of the separator, p ($g/cm^3$) is the true density of the material constituting the separator, and t (cm) is the thickness of the separator. For the measurement of the thickness t, a micrometer can be used. In measuring the thickness, 10 sheets of separators are stacked, and from the thickness thereof under a certain load, a thickness per one sheet is calculated.

$$\text{Porosity (\%)} = 100 - (W/(\rho \times t)) \times 100$$

The porosity of the separator may be measured by, for example, a pure water intrusion porosimeter.

The density of the separator is, for example, 0.3 $g/cm^3$ or more and 0.8 $g/cm^3$ or less, and may be 0.35 $g/cm^3$ or more and 0.7 $g/cm^3$ or less. Here, the density of the separator means a bulk density, and is calculated from the following equation.

$$\text{(Density of separator)} = \text{(Weight of separator)}/[\text{(Area of separator)} \times \text{(Thickness of separator)}]$$

The material of the separator preferably includes cellulose or a derivative thereof. Cellulose is stable against both acids and alkalis, and is stable even in an environment where a high voltage is applied. In addition, the tensile strength is high, and a sufficient strength is maintained even when winding the first electrode and the second electrode together to form a wound electrode group. The separator may be in the form of, for example, a microporous membrane, a woven fabric, or a nonwoven fabric. The thickness of the separator is, for example, 8 to 50 μm, preferably 12 to 35 μm, more preferably 14 to 35 μm or 16 to 35 μm.

A capacitor according to another embodiment of the present disclosure includes a first electrode including a first active material, a second electrode including a second active material, a separator interposed between the first electrode and the second electrode, and an electrolyte solution. One of the first electrode and the second electrode is a positive electrode of the capacitor, and the other is a negative electrode. The first electrode and the second electrode may be the same. The electrolyte solution contains an ionic liquid. The separator includes a porous substrate, and a reduction reaction product of the ionic liquid fixed to the porous substrate.

Note that, in the above, the ionic liquid contained in the electrolyte solution of the capacitor and the ionic liquid where the reduction reaction product fixed to the separator is derived from the reaction thereof may be the same or different. In the following, the ionic liquid where the reduction reaction product is derived from the reaction thereof may be referred to as a "first ionic liquid," and the ionic liquid included in the electrolyte solution of the capacitor may be referred to as the "second ionic liquid."

In addition, a method for manufacturing a capacitor according to an embodiment of the present disclosure is a method for manufacturing a capacitor including a first electrode including a first active material, a second electrode including a second active material, a separator interposed between the first electrode and the second electrode, and an electrolyte solution, and includes steps of preparing a porous substrate, and an ionic liquid, and obtaining a separator by fixing a reduction reaction product of the ionic liquid to the porous substrate.

By using a separator in which a reduction reaction product of the ionic liquid is fixed to a porous substrate, the capacity of a capacitor using the ionic liquid as an electrolyte solution can be increased. This is presumably because the capacitor exhibits capacity through doping and dedoping of the ions constituting the ionic liquid to and from the active material, and in addition, exhibits additional capacity through redox reactions of the ions constituting the ionic liquid. By fixing the reduction reaction product in advance in the separator, the redox reactions are allowed to occur efficiently, increasing the capacity. Furthermore, the charge-discharge efficiency is also improved.

Specifically, for example, when 1-ethyl-3-methylimidazolium tetrafluoroborate ($EMIBF_4$) is used as the ionic liquid, during charging at a voltage of 4.0 V or more, a 1-ethyl-3-methylimidazolium cation ($EMI^+$) can be reduced at the negative electrode, to generate an EMI radical through the reaction shown in the above Reaction Formula 1. On the other hand, during discharging, the reverse reaction of the Reaction Formula 1 proceeds, and a reaction (oxidation reaction) through which the EMI radical releases one electron and returns to the $EMI^+$ cation can proceed. The EMI radical can turn into a carbene through the reaction shown in the above Reaction Formula 2. Also, a dimer can be generated through the reaction shown in the above Reaction Formula 3.

During discharging, the capacitor exhibits additional capacity through the oxidation of the EMI radical back into the EMI cation. However, in the forms of a carbene and a dimer, releasing one electron is difficult, failing to directly contribute to the capacity. Therefore, if the number of the carbenes and dimers generated through the reaction of the EMI radical is large, by that amount, the increase in capacity by redox reactions is suppressed. In addition, part of the electricity quantity provided during charging is consumed to generate a reduction reaction product, resulting in a lowered charge-discharge efficiency.

In this regard, according to a capacitor and a method for manufacturing a capacitor according to an embodiment of the present disclosure, the reduction reaction product (e.g., carbenes and dimers) is fixed in a large number to the separator, increasing the concentration of the reduction reaction product near the negative electrode in a capacitor using this separator. This can shift the equilibrium of each of the Reaction Formulas 2 and 3 toward the left, and during charging of the capacitor, the generation of the reduction reaction product is suppressed. Thus, during discharging, a large number of EMI radicals can be oxidized back into the EMI cations, so that the capacity exhibited through redox reactions can be maintained high, and the charge-discharge efficiency can be enhanced.

In addition, a reduction reaction product present near the positive or negative electrode, if any, may interfere with the formation of an electric double layer, causing a decrease in capacity. However, by suppressing the generation of the reduction reaction product, the interference of the formation of an electric double layer due to the reduction reaction product is suppressed, and the decrease in capacity is suppressed.

Furthermore, by suppressing the generation of the reduction reaction product, the concentration increase of the reduction reaction product in the electrolyte solution is suppressed even after charge-discharge cycles repeated many times, and the increase in the viscosity of the electrolyte solution is also suppressed. Thus, the decrease in capacity after charge-discharge cycles repeated several times is also suppressed.

The step of obtaining a separator includes, for example, a step of placing the porous substrate impregnated with a first ionic liquid between a pair of electrodes, to prepare a cell, and a step of applying a voltage to the cell, to generate a reduction reaction product. The porous substrate is then removed from the cell and washed, thereby to obtain a separator in which the reduction reaction product is fixed to the porous substrate. The porous substrate may be impregnated with an electrolyte solution obtained by mixing the first ionic liquid with another liquid (solvent). The voltage applied to the cell is equal to or higher than the voltage that causes a reduction reaction of the first ionic liquid, and is, for example, 4.0 V or more, depending on the first ionic liquid. The application time is, for example, 5 hours or more. The voltage application cycle may be repeated a plurality of times so that the total voltage application time reaches 5 hours or more.

The configuration of the cell used when fixing the reduction reaction product to the porous substrate (the configuration of the electrode and electrolyte solution, the size, etc.) may be the same as or different from the configuration of the capacitor to be manufactured. For example, the active materials used in the positive and negative electrodes of the cell may be the same as or different from the active materials used in the positive and negative electrodes of the capacitor to be manufactured. The electrolyte solution used in the cell and the electrolyte solution used in the capacitor to be manufactured both contain an ionic liquid, but the ionic liquid concentrations in the electrolyte solutions may be different. The first ionic liquid in the electrolyte solution used in the cell and the ionic liquid (second ionic liquid) in the electrolyte solution used in the capacitor to be manufactured may be different. As described above, it is only necessary that the reduction reaction products are the same, and therefore, it suffices when the first ionic liquid and the second ionic liquid contain the same cation. The anions constituting the ionic liquid may be different.

The porous substrate preferably includes at least one selected from the group consisting of cellulose and a derivative thereof. Cellulose is stable against both acids and alkalis, and is stable even in an environment where a high voltage is applied. In addition, the tensile strength is high, and a sufficient strength is maintained even when winding the first and second electrodes of the capacitor together to form a wound electrode group. The form of the porous substrate may be, for example, a microporous film, a woven fabric, a nonwoven fabric, or the like. The thickness of the porous substrate is, for example, 8 to 50 μm, preferably 12 to 35 μm, more preferably 14 to 35 μm or 16 to 35 μm.

As the porous substrate, a substrate having a structure with a large number of fine pores is preferable in that the reduction reaction product can be easily fixed in the pores. More specifically, preferred is a porous substrate in which fine pores having a pore diameter of less than 2 μm have been developed. With the pores having a pore diameter of 2 μm or more, the reduction reaction product readily passes through the pores, the reduction reaction product hardly fixes thereto. In the porous substrate, in a pore diameter distribution thereof, a total volume Va in the pore diameter range of 0.1 μm to 2 μm may be 0.4 $cm^3/g$ or more. In addition, it is preferable that a total volume Vm in the pore diameter range of 0.01 μm to 6 μm is 0.7 $cm^3/g$ or more. A porous substrate in which the Va is 0.4 $cm^3/g$ or more is highly effective for fixing the reduction reaction product thereto, and a capacitor with a high energy density can be easily realized. The pore volumes Va and Vm are obtained by measuring the differential pore volume distribution or logarithmic differential pore volume distribution of the separator and integrating the pore diameters in the ranges of 0.1 μm to 2 μm and 0.01 μm to 6 μm, respectively. For measurement of the pore volume distribution, a mercury porosimeter based on mercury intrusion method, or a perm porometer based on the bubble point method or gas permeation method can be used.

As the first ionic liquid, a salt compound that exists in a liquid state at room temperature (25° C.) and normal pressure (atmospheric pressure) can be preferably used. Examples of the cations constituting the salt compound include imidazolium-based cations, pyrrolidinium-based cations, pyridinium-based cations, piperidinium-based cations, ammonium-based cations, and phosphonium-based cations. Examples of the anions include halide ions ($Cl^-$, $Br^-$, etc.), tetrafluoroborate ions ($BF_4^-$), hexafluorophosphate ions ($PF_6^-$), bis(fluorosulfonyl)imide ions ($(FSO_2)_2N^-$), and bis(trifluoromethylsulfonyl)imide ions ($(CF_3SO_2)_2N^-$).

When, among these cations, a cation having a heteroaromatic ring is used, a capacitor with extremely high capacity can be realized, in the case of using the separator and using a carbon material having a graphene layer as the active material. Although the reason for this is still under elucidation, it is presumed that π orbitals with delocalization properties derived from the aromatic ring are readily bonded with the π orbitals of the graphene, forming a specifically stable adsorption state.

The cation having a heteroaromatic ring may be an imidazolium cation. The imidazolium cation may be a cation in which part of the hydrogen of the imidazole skeleton is replaced with an alkyl group or the like.

As an example of the imidazolium cation, the cation having a heteroaromatic ring may be a 1-$C_{1-3}$alkyl-3-$C_{1-3}$alkylimidazolium cation, and specifically, may include a 1-ethyl-3-methylimidazolium cation. Of the cation, 80 mol % or more may be a 1-$C_{1-3}$alkyl-3-$C_{1-3}$alkylimidazolium cation or a 1-ethyl-3-methylimidazolium cation.

The content of the reduction reaction product fixed in the separator (i.e., the ratio of the mass of the reduction reaction product to the total mass of the separator) is, for example, 2 mass % or more, and may be 5 mass % or more, 10 mass % or more, 20 mass % or more, or 30 mass % or more. In the capacitor, part of the reduction reaction product fixed in the separator may dissolve in the electrolyte solution, but most of it remains in a fixed state in the separator.

The fixed amount of the reduction reaction product in the separator can be analyzed, for example, by the following method.

First, the separator with reaction products fixed therein is taken out, and the surface thereof is washed with dimethyl carbonate (DMC), followed by drying at room temperature for 2 hours or more in a reduced pressure atmosphere (e.g., 0.1 MPa or less, preferably 10 Pa or less). This is followed by centrifugation, to sufficiently extract a liquid containing the reaction products from inside the separator.

By implementing an ESR analysis on the extracted liquid and analyzing the concentration of the radicals etc. which are the reaction products, the minimum amount of the fixed amount of the reaction products can be specified. By drawing a calibration curve using a standard sample solution for spin quantification (TEMPOL), the radicals which are a reaction product can be quantified.

In addition, by implementing a $^1H$-NMR analysis, two peaks, one attributed the cation ($EMI^+$) and one attributed to the dimer, are detected separately. From the areas of the two peaks, the proportion of the dimer contained in the extracted liquid can be determined.

Examples of the ionic liquid or the second ionic liquid contained in the electrolyte solution of the capacitor include the compounds listed above as the first ionic liquid. The second ionic liquid contains the same cation as the cation constituting the first ionic liquid. The second ionic liquid may be the same as the first ionic liquid.

A high voltage of, for example, 4.0 V or more is applied between the first and second electrodes of the capacitor. In this case, a significantly high capacity is realized.

For adjusting the viscosity of the electrolyte solution and improving the output characteristics, the second ionic liquid may be mixed with a solvent and used as the electrolyte solution. As the solvent, a solvent (nonaqueous solvent) used conventionally as an electrolyte solution for a capacitor can be used as long as it is uniformly mixed with the ionic liquid.

As the nonaqueous solvent, a high-boiling-point solvent is preferable. Examples thereof include: lactones, such as γ-butyrolactone; carbonates, such as propylene carbonate; polyhydric alcohols; such as ethylene glycol and propylene glycol; cyclic sulfones, such as sulfolane; amides, such as N-methylacetamide, N,N-dimethylformamide, and N-methyl-2-pyrrolidone; esters, such as methyl acetate; ethers, such as 1,4-dioxane; ketones, such as methyl ethyl ketone; and formaldehyde.

When the electrolyte solution contains a solvent other than the ionic liquid, the proportion of the ionic liquid in the whole electrolyte solution may be 75 mass % or more, or 80 mass % or more, and may be 90 mass % or more.

As the material for the first active material and/or the second active material, a carbon material having a layer structure can be used. That is, the carbon material includes a stacked structure of layers in each of which carbon atoms are bonded to each other, forming a planar hexagonal network (generally called a graphene layer or a graphene sheet). The carbon material may include a graphene. The graphene may be a reduced graphene oxide or a graphene having a three-dimensional structure.

Graphene is a carbon material whose minimum unit is a graphene sheet having a thickness of one carbon atom, and usually constitutes a stack in which a plurality of graphene sheets are stacked. A graphene sheet is an aggregate or molecule constituted of sp2-bonded carbon having a thickness of one carbon atom, and has a honeycomb lattice structure spreading like a sheet.

At least the first active material of the first active material and the second active material may contain a carbon material having a layer structure.

The carbon material having a layer structure may be used as either an active material on the positive electrode side or an active material on the negative electrode side. However, in one embodiment, the capacity is dramatically increased when an electrode (first electrode or second electrode) including the aforementioned carbon material as an active material is used as the negative electrode. Here, description is given, assuming that at least the first electrode of the first and second electrodes is an electrode including the aforementioned carbon material as an active material (first active material).

The carbon material may contain a reduced graphene oxide. The reduced graphene oxide is obtained by reducing graphene oxide.

Graphene oxide (hereinafter, sometimes referred to as "GO") has a structure in which an oxygen-containing group is bonded to a graphene sheet. It is considered that the oxygen-containing group is mainly bonded to the edge plane of the graphene sheet stack. The oxygen-containing group is a hydrophilic group, such as a hydroxyl group, a carbonyl group, and a carboxyl group. Graphene oxide (GO) generally has dispersibility in a polar solvent, such as water. Graphene oxide (GO) generally has insulating properties because of the inclusion of sp3-bonded carbon.

By reducing graphene oxide (GO), the oxygen-containing group is removed, and reduced graphene oxide (hereinafter, sometimes referred to as "rGO") is obtained. Reduced graphene oxide (rGO) is a graphene analogue having electrical conductivity. Reduced graphene oxide may contain oxygen-containing groups not having been removed in the reduction process. Due to the presence of the functional group such as oxygen atoms in the graphene layer, the crystal structure of the carbon material falls outside the ideal graphene or graphite structure, and in the carbon atoms in the graphene layer, sp2 bonds and sp3 bonds are mixed. As a result, the graphene layers are likely to expand when a high voltage is applied, so that cations and anions can be easily inserted between the graphene layers, and an electric double layer-formation region is likely to expand. Therefore, with a reduced graphene oxide used as an active material, the capacity of the capacitor can be remarkably increased.

In addition, due to the presence of the functional group such as oxygen atoms, a distortion is caused in the planar structure of graphene, leading to disorder in the layer structure (or disorder in the interlayer distance), or the graphene layers are bent or folded, to form a three-dimensional structure. This increases the effective surface area available for adsorption of cations and anions, leading to the realization of high capacity.

Typical graphene usually has a flat sheet-like morphology. On the other hand, the graphene used in the capacitor of the present embodiment may be, rather than flat sheet-like, a graphene sheet stack of various morphologies having a disorder in the layer structure (or a disorder in the interlayer distance) (or having a three-dimensional structure). By using a graphene (graphene sheet stack) having a three-dimensional structure as an active material, the capacity of the capacitor can be remarkably increased.

The three-dimensional structure mainly means a microscopic three-dimensional structure (i.e., a microfine structure) formed in a flaky particle. By having a three-dimensional structure, the overlapping of graphene sheets can be significantly suppressed, as compared to flat sheet-like graphene, and the large surface area of graphene can be effectively utilized. A plurality of raised portions or a plurality of recessed portions (i.e., pleats) are formed on the principal surface (mainly, the 002 plane (basal plane)) of the graphene sheet stack having a three-dimensional structure. With such a three-dimensional structure, the distance between the graphene sheets can be appropriately controlled, and the overlapping of the graphene sheets can be effectively reduced.

The three-dimensional structure may include a bent structure in which a graphene sheet having pleats is bent. Via bent portions, a single graphene sheet may be overlapped in a direction intersecting the plane of the sheet, forming a stack. The radius of curvature of the bent portions in the bent structure is, for example, in the range of 10 to 1000 nm. The interval between the pleats is, for example, in the range of 10 to 100 nm.

The bent structure in the three-dimensional structure may include, for example, a curly structure or a folded structure, in the sheet portion between the bent portions. In this case, the individual graphene sheet stack may have a microporous structure by itself. This improves the diffusion of ions near the surface of the stack. The presence of the curly structure or the folded structure (i.e., pleat portions) can be confirmed from an electron microscope (SEM, TEM, etc.) photograph of the graphene sheet stack.

The curly structure may be, for example, a structure having a plurality of randomly formed pleat-like raised and recessed portions. The folded structure is a structure having folded portions in which one graphene sheet stack is partially folded a plurality of times, and is included in the category of the curly structure. The height of the raised portions or the depth of the recessed portions formed in the folded portions may be greater than the thickness of the carbon portion of the graphene sheet stack having that structure, and may be at least twice as thick as that of the carbon portion.

The graphene having such a three-dimensional structure may have a peak in the pore diameter range of 2 nm to 4 nm in the logarithmic differential pore volume distribution, and may further show quadratic volume increase in the distribution with increase in pore diameter in a pore diameter range of 4 nm to 50 nm. The total pore volume of mesopores in the pore diameter range of 2 nm to 50 nm may be, for example, 0.20 $cm^3/g$ or more. The total pore volume of mesopores may be in the range of 0.20 $cm^3/g$ to 0.5 $cm^3/g$, the range of 0.25 $cm^3/g$ to 0.4 $cm^3/g$, or the range of 0.25 $cm^3/g$ to 0.35 $cm^3/g$. The sum of the volumes of pores with diameters of 4 nm to 50 nm can be, for example, 15 times or more as large as that of pores with diameters of 2 nm to 4 nm.

The specific surface area and pore size distribution of graphene can be measured using BELSORP 28SA apparatus available from MicrotracBEL Corp. Japan. As the theory for mesopores analysis, the Dollimore-Heal method (DH method) is used, where the calculation is performed based on the capillary condensation theory (Kelvin's equation).

With the graphene having such a three-dimensional structure, a capacitor electrode having a maximum peak in the range of 0.3 μm or more and 6 μm or less in the logarithmic differential pore volume distribution measured by a mercury porosimeter can be obtained. By having a three-dimensional structure, the overlapping of graphene sheets can be significantly suppressed, as compared to flat sheet-like graphene, and the surface area of the graphene can be effectively used for ion adsorption. With the three-dimensional structure having a plurality of raised portions or a plurality of recessed portions formed on the basal plane, the distance between the graphene sheets can be appropriately controlled, and the overlapping of the graphene sheets can be effectively reduced. Therefore, the active sites of the active material can be increased, without suppressing the movement (diffusion) of ions, and high capacity can be exhibited. In addition, more amount of reaction products can be moved, which contributes to the exhibition of high capacity.

According to a capacitor according to one embodiment of the present disclosure, specifically, a capacitor in which the capacitance per mass of the active material when a voltage of 4.0 V or more is applied is 300 F/g or more can be realized. A capacitor having a capacitance per mass of the active material of 400 F/g or more, 500 F/g or more, 800 F/g or more, or 1000 F/g or more can also be realized. Here, the capacitance per mass of the active material when a voltage of 4.0 V or more is applied being 300 F/g or more means that, when the capacitor is charged at a voltage of 4.0 V or more and then discharged, there exists a voltage range such that the capacitance reaches 300 F/g or more. With respect to the voltage range in which the capacitance reaches 300 F/g or more, there is no particular limitation as long as it is 4.0 V or more. The capacitance is 300 F/g or more in a voltage range of 4.0 V or more, and, also in a certain voltage range of less than 4.0 V, the capacitance may be 300 F/g or more.

The average number of stacked layers in the graphene sheet stack is, for example, 10 layers or less, and may be 5 layers or less. The graphene sheet stack is more desirable as it closes to a minimum unit of graphene sheet (i.e., single-layer sheet) having a thickness of one carbon atom.

The average number of stacked layers is estimated from an interplanar distance (d002) calculated from a diffraction peak attributed to the 002 plane (basal plane) in an X-ray diffraction profile (e.g., Abstracts of 2015 Autumn Meeting of Japanese Physical Society, p. 1014). Alternatively, it may be an estimated value obtained from an electron microscope (SEM, etc.) photograph of the graphene. For example, the number of stacked layers of graphene sheets can be estimated from the scale of the SEM photograph of graphene and the interplanar distance of the 002 plane (basal plane) of the graphene sheets. For example, random 20 graphene sheet stacks are selected, and the number of stacked layers in each stack is estimated, to determine an average of 10 numerical values in the middle range as the average number of stacked layers, with the largest to the 5th largest numerical values and the smallest to the 5th smallest numerical values excluded.

The interlayer distance between the graphene sheets (i.e., the basal interplanar distance) may have random variations. Random variations in the interlayer distance mean that the crystallinity of the graphene sheet stack is low. The greater the disorder in the layered structure of the graphene is, the more remarkable the variation in the interlayer distance is.

An X-ray diffraction profile of the first carbon usually has a diffraction peak B attributed to the 002 plane. The larger the overlapping between graphene sheets is, and the higher the crystallinity of the graphene is, the sharper the diffraction peak B becomes. On the other hand, when the graphene has a three-dimensional structure, the diffraction peak B becomes broad, and can be waveform-separated into a plurality of peaks. On the higher angle side than the diffraction peak B, a halo pattern attributed to the amorphous phase may be observed.

An interplanar distance d002 of the 002 planes of graphene calculated from the X-ray diffraction profile is, for example, 0.330 nm or more and 0.360 nm or less. The d002 can be determined by waveform-separating a diffraction peak observed at around $2\theta=26.38°$, to calculate a d002 value of each component, and averaging the values. The distance d002 between the 002 planes of the graphene is preferably 0.340 nm (3.40 Å) or more, more preferably 0.360 nm (3.60 Å) or more, further more preferably 0.370 nm (3.70 Å) or more.

With the graphene having the above structure used as an active material, a first electrode and/or a second electrode as a capacitor electrode is manufactured. The capacitor electrode may contain a binder. When forming the graphene having the above three-dimensional structure into an electrode layer, the binder serves to assist the bonding of the graphene to each other and the bonding of the graphene to a current collector.

In the following, an example of a method of manufacturing a graphene according to one embodiment of the present disclosure and an example of a method of manufacturing a capacitor electrode using the graphene manufactured by the above method will be described.

<<Manufacturing Method of Graphene>>

(i) Dispersion Preparation Step

First, an aqueous dispersion containing a graphene oxide is prepared. The aqueous dispersion may contain a dispersant such as carboxymethyl cellulose (CMC) and the like, in addition to the graphene oxide and water. The graphene oxide can be produced by exfoliation, in a single-layer or multi-layer form, from graphite through oxidation of the graphite.

The oxidation of the graphite can be carried out, for example, in water, using an oxidizing agent. Examples of the oxidizing agent include sulfuric acid, potassium permanganate, chromic acid, sodium dichromate, sodium nitrate, peroxide, persulfate, and organic acid peroxide. A water-soluble solvent may be added to the water. Examples of the water-soluble solvent include alcohols, ketones such as acetone, and ethers such as dioxane and tetrahydrofuran. The oxidation reaction in water produces an aqueous dispersion of graphene oxide.

The oxygen content in the graphene oxide is, for example, 10 to 60 mass %, may be 20 to 50 mass %, and may be 30 to 50 mass %.

(ii) Reduction Step

Next, the graphene oxide is reduced in the aqueous dispersion containing the graphene oxide, to produce a reduced graphene oxide (first reduction step). As the reduction method, for example, a hydrothermal treatment is preferred. For example, the aqueous dispersion is sealed into an autoclave and treated hydrothermally, so that a gel-form product can produced. The temperature for the hydrothermal treatment may be, for example, 150° C. or higher, preferably 170° C. or higher and 200° C. or lower.

The hydrothermal treatment alone is possible to obtain a reduced graphene oxide having a three-dimensional structure, but in order to allow the reduction to further proceed, the gel-like product may be brought into contact with a reducing agent (second reduction step). Examples of the reducing agent include metal hydrides, borohydrides, boranes, hydrazines or hydrazides, ascorbic acids, thioglycolic acids, cysteines, sulfurous acids, thiosulfuric acids, and dithionous acids. For example, the gel-form product may be immersed in an aqueous solution containing a water-soluble reducing agent, such as sodium ascorbate. The temperature of the aqueous solution is, for example, 20 to 110° C., may be 40 to 100° C., and may be 50 to 100° C. The amount of the reducing agent used may be adjusted as appropriate, depending on its kind, the oxygen content in a first carbon raw material (graphene oxide), the amount of the gel-form product, and the like.

This may be followed by freeze drying the gel-form product. Through freeze drying, a dry gel (xerogel) in a state in which the three-dimensional structure of graphene is highly maintained can be obtained. The freeze drying is performed, for example, at −50° C. to 0° C., preferably −50° C. to −20° C., under a reduced pressure of, for example, 100 Pa or less, or 1 Pa or less.

Next, the dry gel is thermally reduced in a non-oxidizing atmosphere, to remove the remaining functional group (third reduction step).

The non-oxidizing atmosphere may be a reduced pressure atmosphere (e.g., 0.1 MPa or less (preferably 10 Pa or less)), a reducing atmosphere (e.g., a hydrogen atmosphere of 0.01 MPa or less), an inert gas atmosphere (e.g., a flowing atmosphere of $N_2$, Ar, Ne, He, etc.), and the like.

The heating temperature in the non-oxidizing atmosphere is 700° C. or more, and may be 800° C. or more, 900° C. or more, 1000° C. or more, or 1200° C. or more. However, there is a limit in decreasing the oxygen content in the reduced graphene oxide, and considering production costs, the heating temperature in the non-oxidizing atmosphere may be 1800° C. or less, 1400° C. or less, or 1200° C. or less. When specifying a temperature range, these upper and lower limits may be combined in any combination. The temperature range may be, for example, 1000° C. to 1800° C.

The heating time in the non-oxidizing atmosphere is appropriately selected depending on the heating conditions and the amount of carbon to be treated, and may be, for example, about 0.1 to 5 hours.

The oxygen content in the dry gel after thermal reduction is less than 5 mass %, and may be 4 mass % or less, 3 mass % or less, preferably less than 2.6 mass %, and may be 2 mass % or less, or 1.5 mass % or less. When the oxygen content is deceased to less than 5 mass %, the amount of reaction products generated by redox reactions between the oxygen-containing group and the electrolyte solution components is decreased. Such reaction products block the pores of the electrode, to lower the diffusivity of ions and decrease the number of ion adsorption sites. Therefore, the smaller the amount of reaction products is, the less likely the diffusivity of ions is lowered, and the less likely the number of ion adsorption sites is decreased, making it possible to exhibit high capacity.

The dry gel after thermal reduction is pulverized, to obtain a powder of reduced graphene oxide (rGO powder).

By the above method, graphene (reduced graphene oxide) having a three-dimensional structure is manufactured. Using the manufactured graphene, a capacitor electrode can be manufactured, for example, by the following method.

<<Manufacturing Method of Capacitor Electrode>>

(iii) Electrode Formation Step

For example, the rGO powder is dispersed into a dispersion medium such as water, together with a binder, to prepare a slurry. The resultant slurry is applied onto a conductive substrate (current collector), and drying the applied film, so that an electrode layer supported on the current collector is formed, and a capacitor electrode is obtained. Then, the electrode layer may be rolled.

Examples of the binder include a fluorocarbon resin, such as polytetrafluoroethylene (PTFE), polyvinylidene fluoride (PVdF), and vinylidene fluoride-hexafluoropropylene copolymer (PVdF-HFP), and a water-soluble resin, such as carboxymethyl cellulose (CMC), polyethylene oxide (PEO), polyethylene glycol (PEG), polyacrylonitrile (PAN), polymethyl methacrylate (PMMA), polyvinyl alcohol (PVA), polyvinyl pyrrolidone (PVP), polyacrylic acid (PAA), and polyvinyl acetate.

The electrode layer may contain, in addition to the graphene, other active materials such as activated carbon. In addition, the electrode layer may contain carbon fibers, such as carbon nanotubes (CNTs), and carbon particles, such as carbon black and graphite. However, in view of achieving both high capacity and high reliability, it is desirable that the graphene constitutes 50 mass % or more, more preferably 65 mass % or more, of the electrode layer.

For the current collector, a metal foil, a metal porous body or the like may be used. The material of the current collector may be aluminum, copper, nickel, iron, stainless, platinum, and the like. The material may be an alloy containing the above metal as a major component. The metal foil may be a plane foil, but may be, for example, a foil with a surface roughened by etching or the like, or a plasma-treated foil. The metal porous body has, for example, a three-dimensional network structure.

The mass per unit area of the metal porous body is, for example, 500 g/$m^2$ or less, and may be 150 g/$m^2$ or less. The porosity of the metal porous body is, for example, 80 vol % to 98 vol %, and may be 90 vol % to 98 vol %.

The average pore diameter of the voids of the metal porous body is, for example, 50 μm or more and 1000 μm or less, may be 400 μm or more and 900 μm or less, and may be 450 μm or more and 850 μm or less.

<<Capacitor>>

Next, a description will be given of an example of a capacitor including the above-described capacitor electrodes as the first electrode and the second electrode. FIG. 1 is a partially-cutaway oblique view of a capacitor 10.

The capacitor 10 of the illustrated example includes a wound-type capacitor element 1. The capacitor element 1 is configured by winding a first electrode 2 and a second electrode 3 each in a sheet form, with a separator 4 interposed therebetween. The first electrode 2 and the second electrode 3 respectively have a first current collector and a second current collector each made of a metal, and a first electrode layer and a second electrode layer each supported on a surface of the current collector, and exhibit capacity through adsorbing and desorbing ions thereinto and therefrom. For the first and second current collectors, for example, an aluminum foil is used. The current collectors may have a surface roughened by etching or other techniques. For the separator 4, for example, a nonwoven fabric mainly composed of cellulose is used. To the first and second electrodes 2 and 3, lead wires 5*a* and 5*b* are connected, respectively, as a current leading member. The capacitor element 1 is housed, together with an electrolyte solution (not shown), in a cylindrical outer case 6. The outer case 6 may be made of, for example, a metal, such as aluminum, stainless steel, copper, iron and brass. The opening of the outer case 6 is sealed with a sealing member 7. The lead wires 5*a* and 5*b* are extended outside so as to pass through the sealing member 7. For the sealing member 7, for example, a rubber material, such as butyl rubber, is used.

The electrode layer contains an active material as an essential component, and may contain a binder, a conductive additive, and the like, as optional components. The active material includes the graphene having the characteristics as already described. The electrode layer can be obtained by, for example, kneading, the active material, a binder (e.g., carboxymethyl cellulose (CMC)) and the like, together with water, to prepare a slurry, applying the slurry onto a surface of a current collector, and drying and rolling the applied film.

In the separator, preferably, the aforementioned Va determined from the pore size distribution is 0.4 $cm^3$/g or more. The separator may has the reduction reaction product fixed therein.

The above embodiment describes a wound-type capacitor, but the scope of application of the present invention is not limited to the above, and the present invention is applicable also to a capacitor of another structure, for example, a stacked- or coin-type capacitor.

The present invention will be described in more detail below based on Examples. The present invention, however, is not limited to the Examples.

Examples 1 to 6 and Comparative Examples 1 to 4

(1) Production of Capacitor Electrode

Graphite was oxidized in water using potassium permanganate as an oxidizing agent, to obtain a graphene oxide. An aqueous dispersion containing 1 mass % of the graphene oxide was hydrothermally treated at 180° C. for 6 hours, to obtain a gel-like product (first reduction step).

Subsequently, the gel-like product was immersed in a reducing agent which was an aqueous solution of sodium ascorbate (sodium ascorbate concentration 1.0 mol/L), and then, heated to 100° C. and held for 2 hours, to fully reduce the carbon (second reduction step).

Thereafter, the gel-like product was freeze dried at −20° C. under a reduced pressure of 100 Pa, to obtain a xerogel. Subsequently, the xerogel was heat-treated at 1200° C. for 2 hours under nitrogen flow (third reduction step). The xerogel after the heat treatment was pulverized, to obtain a powder of reduced graphene oxide.

Then, 100 parts by mass of the powder of reduced graphene oxide powder and 10 parts by mass of CMC serving as a binder were dispersed into an appropriate amount of water, to prepare a slurry. The resultant slurry was applied onto a 30-μm-thick current collector made of Al foil, and the applied film was vacuum dried at 110° C., and rolled, into an electrode layer, to give a capacitor electrode.

(2) Preparation of Separator

Nonwoven separators a1 to a4 constituted of cellulose fibers, nonwoven separators a5, a6, b1, and b2 constituted of synthetic fibers containing cellulose fibers, nonwoven separator c1 constituted of polypropylene (PP), and polyolefin-based nonwoven separator d1 were prepared.

The thickness, the porosity, and the density (bulk density) of each of the separators a1 to a6, b1, b2, c1, and d1 are shown in Table 1. In Table 1, the results of the measurement using a mercury porosimeter of the total volume Va in the pore diameter range of 0.1 μm to 2 μm and the total volume Vm in the pore diameter range of 0.01 μm to 6 μm are also shown.

TABLE 1

| separator | thickness (μm) | porosity (%) | density ($g/cm^3$) | Va ($cm^3/g$) | Vm ($cm^3/g$) |
|---|---|---|---|---|---|
| a1 | 35 | 70 | 0.45 | 0.79 | 0.91 |
| a2 | 25 | 71 | 0.44 | 0.73 | 0.99 |
| a3 | 30 | 73 | 0.4 | 0.89 | 1.20 |
| a4 | 20 | 70 | 0.46 | 0.62 | 0.93 |
| a5 | 30 | 73 | 0.41 | 0.50 | 0.84 |
| a6 | 50 | 75 | 0.35 | 0.46 | 0.75 |
| b1 | 21 | 46 | 0.76 | 0.39 | 0.53 |
| b2 | 20 | 43 | 0.80 | 0.17 | 0.56 |
| c1 | 31 | 55 | 0.26 | 0.20 | 0.65 |
| d1 | 20 | 58 | 0.41 | 0.03 | 0.14 |

(3) Fabrication of Capacitor

A pair of capacitor electrodes was prepared and punched out into a square shape of 20 mm by 20 mm. A lead wire was connected to each of the capacitor electrodes, and the capacitor electrodes were stacked, with the separator a1 sandwiched therebetween such that the applied surfaces of the electrode layers faced each other, to obtain a stacked-type capacitor element. The capacitor element was housed, together with an electrolyte solution, into an outer case made of Al laminate, and the case was sealed with a sealing member, to complete a capacitor A1 of Example 1. This was followed by aging treatment at 60° C. for 6 hours under application of a voltage of 2.5 V.

The electrolyte solution used here in the capacitor A1 was 1-ethyl-3-methylimidazolium tetrafluoroborate ($EMIBF_4$) serving as an ionic liquid. The chemical formula of $EMIBF_4$ is shown below.

[Chem. 4]

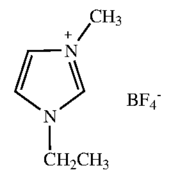

In a similar manner to the above, capacitors A2 to A6, B1, B2, C1 and D1 were fabricated using, instead of the separator a1, the separators a2 to a6, b1, b2, c1 and d1, respectively. The capacitors A1 to A6 correspond to Examples 1 to 6, respectively, and the capacitors B1, B2, C1 and D1 correspond to Comparative Examples 1 to 4, respectively.

With respect to the capacitors A1 to A6, B1, B2, C1, and D1, the following evaluation was performed.

<Evaluation>

Each of the capacitors A1 to A6, B1, B2, C1 and D1 was evaluated for its capacity by the following method.

The manufactured capacitors were charged to a set voltage $V_1$ (=2.8 V), at a constant current of 0.1 to 1 A/g, relative to a cell active material weight (the sum of a positive electrode active material mass and a negative electrode active material mass). This was followed by constant-voltage charging performed at the set voltage $V_1$ for 8 minutes.

After the constant-voltage charging was done, constant-current discharging was performed to 0 V, at a current of 0.1 to 1 A/g, relative to the cell active material weight. The capacity was calculated from the slope of the voltage change from 2.1 V to 0.1 V during discharging. The capacity was calculated from the following equation, where I (A) is the constant current value during discharging, and t (sec) is the discharge time taken for the voltage to drop from 2.1 V to 0.1 V.

$$\text{Capacity } (F) = It/(2.1 - 0.1)$$

From the calculated capacity, given that the positive and negative electrode capacities (the positive and negative electrode active material masses) were the same, a monopolar capacity was calculated, to determine a monopolar capacity $C_1$ (F/g) per 1 g of the positive and negative electrode active material masses when 2.8 V was applied.

The manufactured capacitors were charged and discharged in the same manner as above except for changing the set voltage to $V_2$ (=4.4 V), to determine a monopolar capacity C2 (F/g) per 1 g of the positive and negative electrode active material masses when 4.4 V was applied.

The evaluation results of the monopolar capacities $C_1$ and $C_2$ of each of the capacitors A1 to A6, B1, B2, C1 and D1, and a ratio $C_2/C_1$ of the $C_2$ to the $C_1$ are shown in Table 2, together with the total volume Va in the pore diameter range of 0.1 μm to 2 μm of the separators used.

TABLE 2

| capacitor | Va ($cm^3/g$) | capacity $C_1$ (F/g) | capacity $C_2$ (F/g) | $C_2/C_1$ |
|---|---|---|---|---|
| A1 | 0.79 | 14.0 | 1784 | 1026 |
| A2 | 0.73 | 12.2 | 1275 | 105 |
| A3 | 0.89 | 12.0 | 1054 | 88 |
| A4 | 0.62 | 17.2 | 2497 | 145 |
| A5 | 0.50 | 11.5 | 921 | 80 |
| A6 | 0.46 | 13.0 | 1658 | 128 |
| B1 | 0.39 | 6.9 | 426 | 62 |
| B2 | 0.17 | 4.6 | 310 | 67 |
| C1 | 0.20 | 0.65 | 8.5 | 13 |
| D1 | 0.03 | 0.14 | 6.7 | 46 |

Table 2 shows that when the application voltage to the capacitor was 2.8 V, the difference in capacity $C_1$ was small among the capacitors A1 to A6, B1, B2, C1 and D1. In contrast, when the application voltage to the capacitor was 4.4 V, the difference in capacity $C_2$ among the capacitors A1 to A6, B1, B2, C1, and D1 becomes significantly large. However, with the capacitors A1 to A6, in which the Va of the separator was set to 0.4 $cm^3/g$ or more, high capacity was realized even when a voltage of 4.0 V or more was applied.

Example 7

(1) Production of Capacitor Electrode

A capacitor electrode was obtained in the same manner as in Example 1.

(2) Fabrication of Test Cell

A cellulose nonwoven separator (porous substrate) X1 was prepared.

A pair of capacitor electrodes was prepared and punched out into a square shape of 20 mm by 20 mm. A lead wire was connected to each of the capacitor electrodes, and the capacitor electrodes were stacked, with the separator X1 sandwiched therebetween such that the applied surfaces of the electrode layers faced each other, to obtain a stacked-type capacitor element. The capacitor element was housed, together with an electrolyte solution, into an outer case made of Al laminate, and the case was sealed with a sealing member, to complete a test cell. The electrolyte solution used here was 1-ethyl-3-methylimidazolium tetrafluoroborate ($EMIBF_4$) serving as an ionic liquid.

Thereafter, a voltage of 4.4 V to 4.6 V was applied to the test cell for 5 hours.

The separator (porous substrate) was taken out from the test cell after application of voltage, and washed with dimethyl carbonate (DMC), and then, dried for 2 hours under reduced pressure at room temperature, to obtain a separator Y1 in which the reduction reaction product was fixed. The electrolyte solution in the test cell after application of voltage turned its color to brown, and the separator Y1 was also tinted with brown.

The electrolyte solution taken out from the test cell was analyzed by 1H-NMR, $^{13}C$-NMR, $^{11}B$-NMR, and $^{19}F$-NMR. The results of $^1H$-NMR and $^{13}C$-NMR confirmed the presence of the EMI dimer shown in the Chem. 3. On the other hand, from the results of $^{11}B$-NMR and $^{19}F$-NMR, no oxidation reaction product derived from the anions of the ionic liquid was confirmed, and the form of anions was confirmed to have stayed unchanged as $BF_4^-$. In addition, ESR analysis was performed on the electrolyte solution taken out from the test cell, and the results confirmed the presence of EMI radicals and EMI carbene.

The measurement of the mass of the separator Y1 observed a 33% mass increase, as compared to that in the state before application of voltage (separator X1). The mass increase is considered to be due to the reduction reaction product fixed therein.

(3) Fabrication of Capacitor

A pair of capacitor electrodes was prepared. With unused $EMIBF_4$ serving as an electrolyte solution and the separator Y1, a capacitor element was produced in the same manner as in the fabrication of the test cell, and a capacitor A7 was obtained.

Example 8

A nonwoven fabric separator (porous substrate) X2 made of mixed fibers containing cellulose was prepared.

In the same manner as in Example 7 except for the above, a separator Y2 in which the reduction reaction product was fixed was obtained from the separator X2. A capacitor element was produced using the separator Y2, and a capacitor A8 was obtained.

Comparative Example 5

A pair of capacitor electrodes was prepared. With unused $EMIBF_4$ serving as an electrolyte solution and the separator X1, a capacitor element was produced in the same manner as the fabrication of the test cell, and a capacitor E1 was obtained.

In other words, the test cell including the separator X1 before voltage application treatment of 4.4 V to 4.6 V was used as the capacitor E1, and subjected to evaluation.

Comparative Example 6

A pair of capacitor electrodes was prepared. With unused $EMIBF_4$ serving as an electrolyte solution and the separator X2, a capacitor element was produced in the same manner as the fabrication of the test cell, and a capacitor E2 was obtained.

In other words, the test cell including the separator X2 before voltage application treatment of 4.4 V to 4.6 V was used as the capacitor E2, and subjected to evaluation.

The capacitors A7 and A8 correspond to Examples 7 and 8, respectively, and the capacitors E1 and E2 correspond to Comparative Examples 5 and 6, respectively.

With respect to the capacitors A7, A8, E1, and E2, the following evaluation was performed.

(Monopolar Capacity Measurement)

The manufactured capacitors were charged to a set voltage (4.6 V), at a constant current of 0.1 A/g to 1 A/g, relative to a cell active material weight (the sum of a positive electrode active material mass and a negative electrode active material mass). This was followed by constant-voltage charging performed at the set voltage for 8 minutes.

After the constant-voltage charging was done, constant-current discharge was performed to 0 V, at a current of 0.1 A/g to 1 A/g, relative to the cell active material weight. The capacity was calculated from the slope of the voltage change from 2.1 V to 0.1 V during discharging. The capacity was calculated from the following equation, where I (A) is the constant current value during discharging, and t (sec) is the discharge time taken for the voltage to drop from 2.1 V to 0.1 V.

$$\text{Capacity } (F) = It/(2.1 - 0.1)$$

From the calculated capacity, given that the positive and negative electrode capacities (the masses of the positive and negative electrode active materials) were the same, a monopolar capacity was calculated, to determine a monopolar capacity $C_0$ (F/g) per 1 g of the positive and negative electrode active material masses when 4.6 V was applied.

(Charge-Discharge Efficiency)

The manufactured capacitors were subjected to 250 cycles, each cycle consisting of the following charging 1 and discharging 1.

[Charging 1]

Constant-current charging was performed to a set voltage (=4.6 V), at a constant current of 0.1 A/g to 1 A/g, relative to a cell active material weight (the sum of a positive electrode active material mass and a negative electrode active material mass), followed by constant-voltage charging performed at the set voltage for 8 minutes.

[Discharging 1]

Constant-current discharge was performed to 0 V, at a current of 0.1 A/g to 1 A/g, relative to the cell active material weight.

In each cycle, the charged electricity quantity Q1 in the charging 1 and the discharged electricity quantity Q2 in the discharging 1 were measured, and R=(Q2/Q1)×100 was calculated and evaluated as a charge-discharge efficiency.

Figure 2:
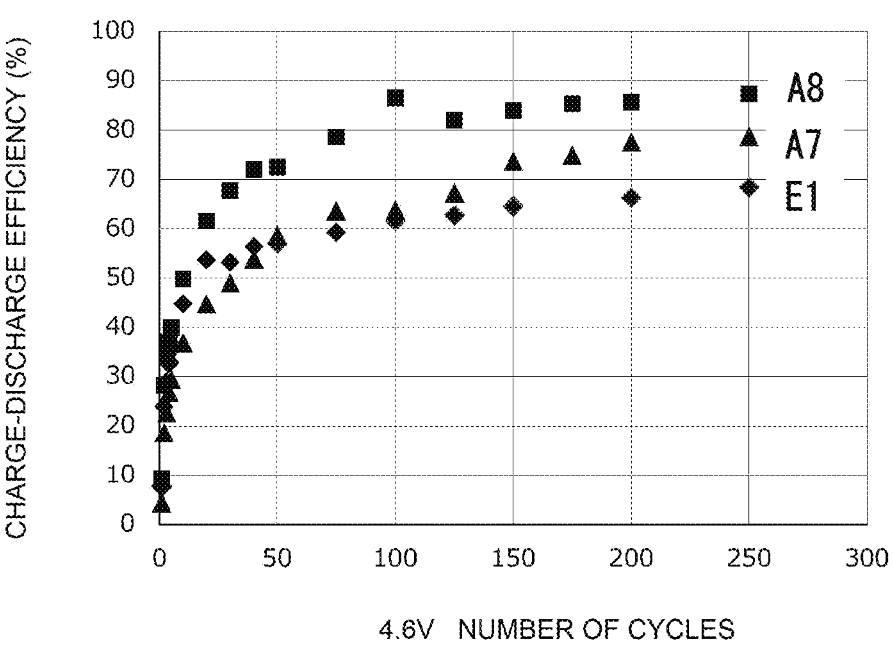
FIG. 2 A graph showing the charge-discharge efficiency of capacitors of Examples 7 and 8 and Comparative Example 5.

The evaluation results of the monopolar capacity $C_0$ and the charge-discharge efficiency $Q_2/Q_1$ at the 250th cycle in each of the capacitors A7, A8, E1, and E2 are shown in Table 3. In FIG. 2, the change in charge-discharge efficiency $Q_2/Q_1$ with the number of cycles in each of the capacitors A7, A8, and E1 are also shown.

TABLE 3

| capacitor | capacity $C_0$ (F/g) | charge-discharge efficiency at 250th cycle $Q_2/Q_1$ (%) |
|---|---|---|
| A7 | 1120 | 79.0 |
| A8 | 1330 | 88.4 |
| E1 | 890 | 68.5 |
| E2 | 901 | 74.0 |

From Table 3 and FIG. 2, in the capacitors A7 and A8 in which a separator with a reduction reaction product fixed in advance was used, as compared to the capacitors E1 and E2 in which no reduction reaction product was fixed in the separator, the capacity $C_0$ was increased, and the charge-discharge efficiency was also enhanced.

INDUSTRIAL APPLICABILITY

According to the present invention, a capacitor having a high energy density can be obtained.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

REFERENCE SIGNS LIST

1: capacitor element, 2: first electrode, 3: second electrode, 4: separator, 5*a*: first lead wire, 5*b*: second lead wire, 6: outer case, 7: sealing member, 10: capacitor

The invention claimed is:

1. A capacitor, comprising:
- a first electrode including a first active material;
- a second electrode including a second active material;
- a separator interposed between the first electrode and the second electrode; and
- an electrolyte solution, wherein
- the electrolyte solution contains an ionic liquid, and
- the separator includes a porous substrate, and a reduction reaction product of the ionic liquid fixed to the porous substrate.

2. The capacitor according to claim 1, wherein a content of the reduction reaction product fixed in the separator is 2 mass % or more.

3. The capacitor according to claim 1, wherein in a pore diameter distribution of the separator, a total volume Va in a pore diameter range of 0.1 μm to 2 μm is 0.4 $cm^3/g$ or more.

4. The capacitor according to claim 1, wherein a voltage of 4.0 V or more is applied between the first electrode and the second electrode.

5. The capacitor according to claim 1, wherein the pore diameter distribution of the separator, a total volume Vm in a pore diameter range of 0.01 μm to 6 μm is 0.7 $cm^3/g$ or more.

6. The capacitor according to claim 1, wherein a porosity of the separator is 60% or more.

7. The capacitor according to claim 1, wherein at least the first active material of the first active material and the second active material includes a reduced graphene oxide.

8. The capacitor according to claim 7, wherein the reduced graphene oxide has a peak in a pore diameter range of 2 nm to 4 nm in a logarithmic differential pore volume distribution, and shows quadratic volume increase in the distribution with increase in pore diameter in a pore diameter range of 4 nm to 50 nm.

9. The capacitor according to claim 1, wherein the ionic liquid contains a cation having a heteroaromatic ring.

10. The capacitor according to claim 9, wherein the cation includes a 1-ethyl-3-methylimidazolium cation.

11. The capacitor according to claim 1, wherein a capacitance per mass of the first active material when a voltage of 4.0 V or more is applied is 300 F/g or more.

12. A method for manufacturing a capacitor including
- a first electrode including a first active material,
- a second electrode including a second active material,
- a separator interposed between the first electrode and the second electrode, and
- an electrolyte solution,
- the method comprising steps of:
- preparing a porous substrate, and an ionic liquid; and
- obtaining a separator by fixing a reduction reaction product of the ionic liquid to the porous substrate.

13. The method for manufacturing a capacitor according to claim 12, wherein
- the step of obtaining a separator includes steps of:
- placing the porous substrate impregnated with the ionic liquid between a pair of electrodes, to form a cell; and
- applying a voltage to the cell, to generate the reduction reaction product.

14. The method for manufacturing a capacitor according to claim 12, wherein the porous substrate includes at least one selected from the group consisting of cellulose and a derivative thereof.

15. The method for manufacturing a capacitor according to claim 12, wherein the ionic liquid contains a cation having a heteroaromatic ring.

16. The method for manufacturing a capacitor according to claim 15, wherein the cation includes a 1-ethyl-3-methylimidazolium cation.

* * * * *